Dec. 14, 1965

L. A. SIDEBOTTOM 3,223,127

MEASURING GLASS DRAINAGE TRAY

Filed Nov. 13, 1963

INVENTOR
Lewis A. Sidebottom

BY R. S. Berry

ATTORNEY

United States Patent Office 3,223,127

Patented Dec. 14, 1965

3,223,127

MEASURING GLASS DRAINAGE TRAY

Lewis A. Sidebottom, 1312 W. 103rd St., Los Angeles, Calif.

Filed Nov. 13, 1963, Ser. No. 323,457

2 Claims. (Cl. 141—364)

This invention relates to a drainage tray and has as its primary object the provision of a tray for receiving and supporting a liquid measuring glass immediately after use thereof in such manner as to drain therefrom liquid remaining in the glass following a measuring operation.

A particular object is to provide a drainage tray which is especially applicable for use by persons, particularly bar tenders, when preparing mixed drinks involving the use of a measuring glass or cup in measuring a quantity of liquor to be embodied in the drinks. Such measuring glass or cup usually comprises a tapered receptacle, colloquially termed a "jigger," which ordinarily has a capacity to contain, when filled, a dram of liquor.

In preparing a mixed drink, a quantity of liquor is customarily poured from a bottle into a measuring glass from which the measured liquor is poured into a mixer. The emptied measuring glass is then usually set aside and subsequently rinsed and wiped in readiness for reuse. The latter operation is time consuming and may interfere with the service where the task of rinsing and wiping the glass is that of a bar tender.

The purpose of the present invention is to provide a means whereby the rinsing and wiping of the measuring glass after each use thereof may be dispensed with.

Figure 1:
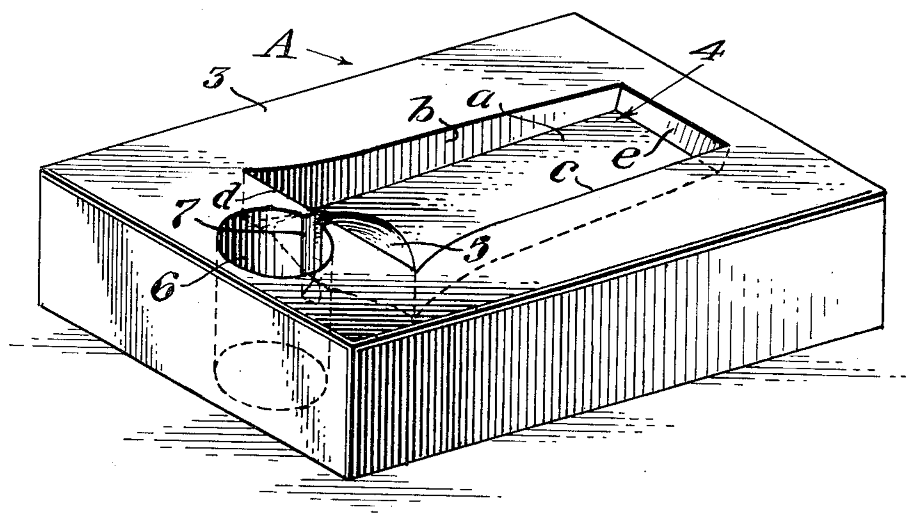
Figure 2:
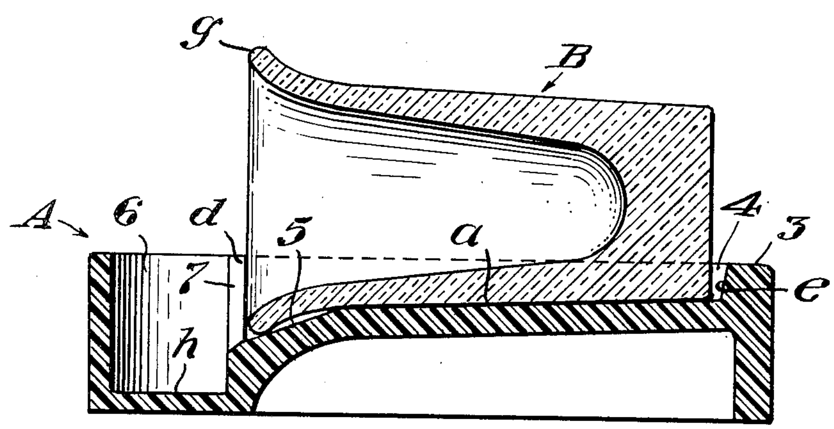

Such means comprises a tray adapted to receive and support a measuring glass positioned on its side as illustrated in the accompanying drawing in which:

FIG. 1 is an isometric view of the tray showing it as positioned in readiness for use, and FIG. 2 is a view in longitudinal section and elevation of the tray and measuring glass depicting the glass disposed on the tray in its draining position.

Referring to the drawings more specifically A indicates generally a tray comprising a unitary body slidably seatable on a horizontal flat surface such as that of the top of a service bar, shelf or table. The tray A embodies an upper side 3 which in carrying out the invention has an elongated recess 4 of substantially rectangular outline having a bottom wall *a* bordered by opposed side walls *b* and *c* and opposed front and read end walls *d* and *e*. The bottom *a* is preferably slightly inclined downward from the rear end wall *e* to the front end wall *d* when the tray is horizontally disposed.

The recess 4 is provided for the reception of a measuring glass B of "jigger" disposed on its side with its open end presented to the end wall *d*. The measuring glass B is usually provided with a flared outer end portion terminating in an annular rim *g* and accordingly the bottom wall *a* may be provided with a concave semi-annular depression 5 adjacent the end wall *d* to receive the flared end portion of the glass B. The bottom of the depression 5 substantially conforms to the portion of the annular rim *g* of the glass seated thereon thereby stabilizing the glass and holding it against free lateral rotating movement on the tray.

The tray A has an open topped well 6 on its upper side 3 in outward spaced relation yet adjacent to the end wall *d* of the recess 4 which well has a bottom wall *h* disposed on a plane spaced below the depression 5. The end wall *d* is provided with a passage 7 leading from the recess 4 to the well 6, and affording a communication between the recess and well. The bottom of the passage 7 extends in continuation of the bottom of the depression 5 whereby liquid deposited in the recess 4 and depression 5 will be directed into the well 6.

The tray A is here shown as rectangular in outline and the upper side 3 thereof is shown as flat, but such outline and upper side may obviously be of any desired contour.

In the operation of the invention, on the measuring glass B being employed in measuring a quantity of liquor and the measured liquor poured therefrom the emptied or nearly emptied glass is deposited on its side in the recess 4 with the rim *g* of the glass presented to the end wall *d* and overlying the depression 5 whereupon such liquor as may then be contained in the glass will drain from the open end thereof and will flow through the passage 7 into the well 6.

This drainage operation occurs rapidly so that if need be or occasion requires the glass may be almost immediately removed from the tray and reused.

After a number of the recited drainage operations being effected a quantity of liquor may be accumulated in the well 6 which liquor may be readily poured from the well as need be.

I claim:

1. A holder for supporting a measuring glass to drain liquor therefrom comprising a tray embodying an upper side having an elongated recess having a bottom wall bordered by upstanding opposing side walls and opposed front and rear end walls substantially conformable to the sides and ends of a measuring glass disposed side-ways in said recess and resting on the bottom wall thereof with the open end of the glass presented to said front end wall, and an open topped well in said tray leading down from said upper side contiguous the front end wall of said recess and extending below said bottom wall; said front end wall having a passage leading between and communicating said recess and well having a bottom leading in continuation of the bottom wall of said recess.

2. The structure called for in claim 1 in which the recess bottom wall has a depression contiguous said front end wall substantially conformable to the rim of a measuring glass lying in said recess.

References Cited by the Examiner

UNITED STATES PATENTS

| | | | |
|---|---|---|---|
| 170,477 | 11/1875 | Jewett | 141—364 |
| 2,201,634 | 5/1940 | Shurts | 141—364 X |
| 2,591,526 | 4/1952 | Fales et al. | 141—106 |
| 2,762,527 | 9/1956 | Manley | 141—364 X |

FOREIGN PATENTS

| | | |
|---|---|---|
| 811,143 | 8/1951 | *Germany.* |

LAVERNE D. GEIGER, *Primary Examiner.*